Patented July 18, 1939

2,166,278

UNITED STATES PATENT OFFICE 2,166,278

FOOD PRODUCT AND METHOD OF MAKING THE SAME

Sterling W. Alderfer, Akron, Ohio

No Drawing. Application March 25, 1938, Serial No. 198,050

2 Claims. (Cl. 99—193)

This invention relates to food products and to methods of making the same, and more especially it relates to a cooked potato product and to procedure for preserving the same for future consumption.

The invention is directed primarily to the food product commonly known as mashed potatoes. In their best form mashed potatoes are characterized by light consistency and fineness of texture that only can be obtained by the use of a power-driven mechanical beater, such mashed potatoes sometimes being said to be "whipped" or "fluffed".

It is well known that mashed potato, and in fact, any other form of white potato (Solanum tuberosum), is best served hot after being boiled, the flavor of the potato at this time being better and different than the flavor after the potato has cooled. Thus cold boiled potatoes usually are prepared for eating by frying, and if mashed, they are made into potato cakes and fried. It is for this reason that heretofore it has not been desirable to utilize canned mashed potatoes except for slicing into cakes to be fried.

The reason for the definitely inferior flavor of cold boiled potatoes apparently is due to a change in the structure of the starch granules that constitute the solid matter of white potatoes. These starch granules are insoluble in cold water, but when heated with water the granules burst and a viscous liquid is formed. This liquid normally is present only so long as the potatoes are hot. Upon cooling the said liquid becomes an irreversible paste or mucilaginous substance so that it is impossible to restore the cold potato to original consistency and flavor. The change that occurs in the boiled potato upon cooling is a chemical process of decomposition, known as hydrolysis, that eventually results in the formation of dextrin.

The chief objects of this invention are to provide an improved packaged potato product in which the original flavor and consistency of the potato is preserved; and to provide an improved method of preparing a product of the character mentioned. More specifically the invention aims to provide packaged mashed or whipped potatoes that may be re-heated and served in original form and with original flavor and consistency. Other objects will be manifest as the specification proceeds.

In the preparation of the improved food product according to the invention, white potatoes are boiled in water for the required length of time, the water being salted in the usual manner to improve the flavor of the potatoes. After the potatoes are thoroughly cooked they are drained and mashed, and butter and cream or milk added. They are then whipped or fluffed by means of a high-speed power-driven beater to improve their texture and consistency. The method thus far is well known in the culinary art and no novelty is alleged to reside therein. The next step preferably is to form the product, while still hot, into portions of determinate shape and size, say 1½ pounds, and to enclose the same in suitable containers, such as cardboard cartons. Immediately thereafter the still-warm product is subjected to sharp freezing which reduces the product to a solid cake. It will be understood, however, that it may be desirable to freeze the product before dividing it into portions and wrapping the same, and it is within the purview of the invention that such sequence of operations be employed if desired, the important feature being that the freezing operation be applied to the product while the latter is still hot. Thereafter the product is maintained in frozen condition while being transported and marketed.

When the product is to be used by the ultimate consumer, it is placed, while still in frozen condition, in a steamer and heated so that there is no lapse of time between the thawing and heating. When thoroughly heated the product will have the same consistency and flavor that it had before freezing, and is ready for serving and consumption.

By reason of the invention it is possible for novices and busy housewives to purchase mashed or whipped potatoes of high quality that quickly are made ready for serving, and which have a consistency and flavor equal to the best home-cooked potatoes. The original flavor of the potatoes is preserved by the freezing thereof substantially before the viscous liquid product of the boiled starch granules begins hydrolyzation, and by re-heating the frozen product without allowing an appreciable time interval between the frozen and heated phases of the product.

Modification may be resorted to without departing from the spirit of the invention, or the scope thereof as defined by the appended claims.

What is claimed is:

1. The method of making a food product which comprises boiling white potatoes, mashing, whipping and seasoning the same, and then, while still hot, subjecting them to sharp freezing to inhibit hydrolysis therein.

2. The method of making a food product which comprises boiling white potatoes, mashing, whipping and seasoning the same, subjecting the hot, mashed product immediately to sharp freezing to inhibit hydrolysis therein, and maintaining the product in frozen condition until reheated in preparation for consumption.

STERLING W. ALDERFER.